United States Patent
Yaccarino et al.

(10) Patent No.: US 9,666,932 B2
(45) Date of Patent: May 30, 2017

(54) ARRAY ANTENNA WITH SHAPED BEAM PATTERN FOR TOLL ROAD COLLECTION SYSTEM APPLICATIONS

(71) Applicant: RAYTHEON COMPANY, Waltham, MA (US)

(72) Inventors: Robert G. Yaccarino, El Segundo, CA (US); Fangchou Yang, El Segundo, CA (US); Stan W. Livingston, Buena Park, CA (US); Tim Gehle, Buena Park, CA (US); Jose I. Valdez, Fullerton, CA (US)

(73) Assignee: RAYTHEON COMPANY, Waltham, MA (US)

( * ) Notice: Subject to any disclaimer, the term of this patent is extended or adjusted under 35 U.S.C. 154(b) by 484 days.

(21) Appl. No.: 14/185,720

(22) Filed: Feb. 20, 2014

(65) Prior Publication Data
US 2015/0236400 A1    Aug. 20, 2015

(51) Int. Cl.
| | |
|---|---|
| *H01Q 1/22* | (2006.01) |
| *H01Q 3/24* | (2006.01) |
| *H01Q 21/00* | (2006.01) |
| *G06K 7/10* | (2006.01) |
| *G07B 15/06* | (2011.01) |

(52) U.S. Cl.
CPC ....... *H01Q 1/2216* (2013.01); *G06K 7/10089* (2013.01); *G06K 7/10356* (2013.01); *G06K 7/10425* (2013.01); *G07B 15/063* (2013.01); *H01Q 3/24* (2013.01); *H01Q 21/0006* (2013.01)

(58) Field of Classification Search
None
See application file for complete search history.

(56) References Cited

U.S. PATENT DOCUMENTS

| 5,751,227 A | 5/1998 | Yoshida et al. |
| 5,805,082 A | 9/1998 | Hassett |
| 2004/0041715 A1 | 3/2004 | Terashima et al. |

OTHER PUBLICATIONS

Orchard et al., "Optimising the synthesis of shaped beam antenna patterns," IEE Proceedings, 132(1): 63-68, 1985.
RFID Antenna Application Guide, p. 25.
Ares, et al. "Synthesis of Very Large Planar Arrays for Prescribed Footprint Illuminanon", IEEE Transactions on Antennas and Propagation, vol. 56, No, 2, Feb. 1, 2008 (pp. 584-589).
Grabow, et al. "5.8 GHz Phased array Antenna for Electronic Toll Collection in Road Traffic Applications" , 1996 IEEE MTT-S International Microwave Symposium Digest, Jun. 17-21, 1996, vol. 1 (pp. 325-328).

(Continued)

*Primary Examiner* — Daniell L Negron
(74) *Attorney, Agent, or Firm* — Lewis Roca Rothgerber Christie LLP

(57) ABSTRACT

A system for properly illuminating a toll collection zone without illuminating any areas outside the toll collection zone in which vehicles may be found, while minimizing lost tolls due to shadowing of shorter vehicles by taller vehicles. In one embodiment, a linear array antenna is configured to illuminate a rectangular collection zone from a point offset from the center of the roadway. The linear array antenna is configured to produce an asymmetric antenna pattern providing RF illumination over the rectangular collection zone sufficient for reliable reading of vehicle RF tags in the collection zone, and which also minimizes spillover of RF power outside the collection zone.

20 Claims, 5 Drawing Sheets

(56) References Cited

OTHER PUBLICATIONS

Written Opinion of the International Searching Authority for International Application No. PCT/US2014/070971, filed Dec. 17, 2014, Written Opinion of the international Searching Authority mailed Mar. 25, 2015 (7 pgs.).
International Search Report for International Application No, PCT/US2014/070971, filed Dec. 17, 2014, International Search Report dated Mar. 18, 2015 and mailed Mar. 25, 2015 (4 pgs.).

ARRAY ANTENNA WITH SHAPED BEAM PATTERN FOR TOLL ROAD COLLECTION SYSTEM APPLICATIONS

BACKGROUND

1. Field

One or more aspects of embodiments according to the present invention relate to toll-road collections systems and, more particularly, to a system for providing a tailored illumination pattern for a radio-frequency (RF) automated toll-road collection system.

2. Description of Related Art

Automated toll-road collection systems for motor vehicle traffic may be installed along a road, or at entrances to or exits from a road, on which tolls are charged to vehicles using the road. Such a system may use RF interrogation to read an RF responsive tag in each vehicle passing through a region illuminated with RF radiation, to identify each vehicle and charge a corresponding toll.

In some locations a road on which tolls are to be collected may be adjacent to, for example, a road on which tolls are not to be collected. Unintentional interrogation of the tags in vehicles on the latter may result in tolls being charged when they should not be. Moreover, in some cases a toll-road collection system may fail to collect a toll that is due. For example, a short vehicle, such as an automobile, following a tall vehicle, such as a large truck, may not be adequately illuminated as a result of the short vehicle being in the tall vehicle's shadow.

An RF interrogation system may include a directional RF antenna center-mounted on an overhead gantry illuminating a section of road on which vehicles approaching the gantry are identified by their RF tags. Positioning the RF antenna to one side of the road may mitigate the problem of shadowing but it may exacerbate the problem of illuminating areas in which tolls should not be charged.

Thus, there is a need for an RF interrogation system that illuminates the desired toll collection region and which mitigates vehicle shadowing.

SUMMARY

When operating an RF interrogation system for toll-road collection, it is desirable to properly illuminate the toll collection zone without illuminating any areas outside the toll collection zone in which vehicles may be found. It is also desirable to minimize lost tolls due to shadowing of shorter vehicles by taller vehicles. In one embodiment, a linear array antenna is configured to illuminate a rectangular collection zone from a point offset from the center of the roadway. The linear array antenna is configured to produce an asymmetric antenna pattern providing RF illumination over the rectangular collection zone sufficient for reliable reading of vehicle RF tags in the collection zone, and which also minimizes spillover of RF power outside the collection zone.

According to an embodiment of the present invention there is provided a array antenna for toll collection over a first rectangular zone, the antenna including: a plurality of elements; and a feed network operatively coupled to the plurality of elements; the elements and the feed network configured to form a first asymmetric transmitting antenna pattern and a first asymmetric receiving antenna pattern, the first transmitting antenna pattern being substantially the same as the first receiving antenna pattern, and the first transmitting antenna pattern having a gain exceeding a threshold over the first rectangular zone, and a gain less than the threshold in a region outside the first rectangular zone.

In one embodiment, each of the elements is associated with a complex weight.

In one embodiment, each complex weight being substantially equal to a corresponding complex weight produced by an Orchard-Elliot synthesis technique executed with a first piecewise-linear desired antenna pattern.

In one embodiment, the first piecewise-linear desired antenna pattern has four nodes, each of the four nodes corresponding to one corner of the first rectangular zone.

In one embodiment, the power gain of the first piecewise-linear desired antenna pattern at each of the nodes is proportional to the reciprocal of the square of the distance from the array antenna to the corresponding corner of the first rectangular zone.

In one embodiment, the first piecewise-linear desired antenna pattern falls off with a first constant slope, in decibels (dB) per degree, at angles less than the angle of a first node and the first piecewise-linear desired antenna pattern falls off with a second constant slope, in dB per degree, at angles exceeding the angle of a fourth node.

In one embodiment, the first constant slope is within 30% of 1 dB per degree, and the second constant slope is within 30% of 1 dB per degree.

In one embodiment, the first rectangular zone has a length between 60 and 80 feet, and a width between 30 feet and 50 feet.

In one embodiment, the first rectangular zone is horizontal, and the array antenna is located above a short edge of the first rectangular zone, at a point between 1 foot and 10 feet from a long edge of the first rectangular zone.

In one embodiment, the array antenna includes 8 elements.

In one embodiment, each of the 8 elements is associated with a complex weight, the complex weights having substantially the following relative amplitudes and phases, respectively:

| Element number | Amplitude | Phase (degrees) |
| --- | --- | --- |
| 1 | 0.477 | −72.102 |
| 2 | 0.602 | −52.656 |
| 3 | 1 | 0 |
| 4 | 0.925 | 19.942 |
| 5 | 0.953 | 78.395 |
| 6 | 0.934 | 40.881 |
| 7 | 0.992 | −43.73 |
| 8 | 0.648 | −87.617 |

In one embodiment, the center of each of the 8 elements is separated from the center of an adjacent element of the 8 elements by a distance of 5.8 inches, and the array antenna is configured to operate at a frequency of 915 MHz.

In one embodiment, the array includes one or more switches configured to switch between a first configuration and a second configuration, wherein: in the first configuration, the elements and the feed network are configured to form a first asymmetric transmitting antenna pattern and a first asymmetric receiving antenna pattern, the first transmitting antenna pattern being substantially the same as the first receiving antenna pattern, the first transmitting antenna pattern having a gain exceeding a threshold over the first rectangular zone, and a gain less than the threshold in a region outside of the first rectangular zone; and in the second configuration, the elements and the feed network are configured to form a second asymmetric transmitting antenna pattern and a second asymmetric receiving antenna pattern, the second transmitting antenna pattern being substantially the same as the second receiving antenna pattern, the second transmitting antenna pattern having a gain exceeding the threshold over a second rectangular zone, and a gain less than the threshold in a region outside of the second rectangular zone.

In one embodiment, one of the one or more switches is an electronically controlled switch.

In one embodiment, the system includes a gantry installed over a roadway, and a first array antenna, the first array antenna being an array antenna including a plurality of elements; and a feed network operatively coupled to the plurality of elements; the elements and the feed network configured to form a first asymmetric transmitting antenna pattern and a first asymmetric receiving antenna pattern, the first transmitting antenna pattern being substantially the same as the first receiving antenna pattern, and the first transmitting antenna pattern having a gain exceeding a threshold over the first rectangular zone, and a gain less than the threshold in each of two regions on either side of the first rectangular zone.

In one embodiment, the first array antenna includes one or more switches configured to switch between a first configuration and a second configuration, wherein: in the first configuration, the elements and the feed network are configured to form a first asymmetric transmitting antenna pattern and a first asymmetric receiving antenna pattern, the first transmitting antenna pattern being substantially the same as the first receiving antenna pattern, the first transmitting antenna pattern having a gain exceeding a threshold over the first rectangular zone, and a gain less than the threshold in a region outside of the first rectangular zone; and in the second configuration, the elements and the feed network are configured to form a second asymmetric transmitting antenna pattern and a second asymmetric receiving antenna pattern, the second transmitting antenna pattern being substantially the same as the second receiving antenna pattern, the second transmitting antenna pattern having a gain exceeding the threshold over a second rectangular zone, and a gain less than the threshold in a region outside of the second rectangular zone.

In one embodiment, the roadway includes a set of parallel lanes, the first rectangular zone includes a first subset of the set of parallel lanes, the lanes in the first subset being contiguous, and the second rectangular zone includes a second subset of the set of parallel lanes, the lanes in the second subset being contiguous.

In one embodiment, one of the one or more switches is an electronically controlled switch, and the system is configured to switch electronically to select: the first configuration when the first subset of parallel contiguous lanes is configured to carry vehicle traffic subject to toll charges; and the second configuration when the second subset of parallel contiguous lanes is configured to carry vehicle traffic subject to toll charges.

In one embodiment, the system includes: a gantry installed over a roadway; a first array antenna, secured to the gantry, the first array antenna being an array antenna including a plurality of elements; and a feed network operatively coupled to the plurality of elements; the elements and the feed network configured to form a first asymmetric transmitting antenna pattern and a first asymmetric receiving antenna pattern, the first transmitting antenna pattern being substantially the same as the first receiving antenna pattern, and the first transmitting antenna pattern having a gain exceeding a threshold over the first rectangular zone, and a gain less than the threshold in a region outside of the first rectangular zone; and a second array antenna, secured to the gantry, the second antenna being an array antenna including a plurality of elements; and a feed network operatively coupled to the plurality of elements; the elements and the feed network configured to form a first asymmetric transmitting antenna pattern and a first asymmetric receiving antenna pattern, the first transmitting antenna pattern being substantially the same as the first receiving antenna pattern, and the first transmitting antenna pattern having a gain exceeding a threshold over the first rectangular zone, and a gain less than the threshold in a region outside of the first rectangular zone.

In one embodiment, the first rectangular zone of the first array antenna is the same rectangular zone as the first rectangular zone of the second array antenna.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of an array antenna with shaped beam pattern for toll road collection system applications provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
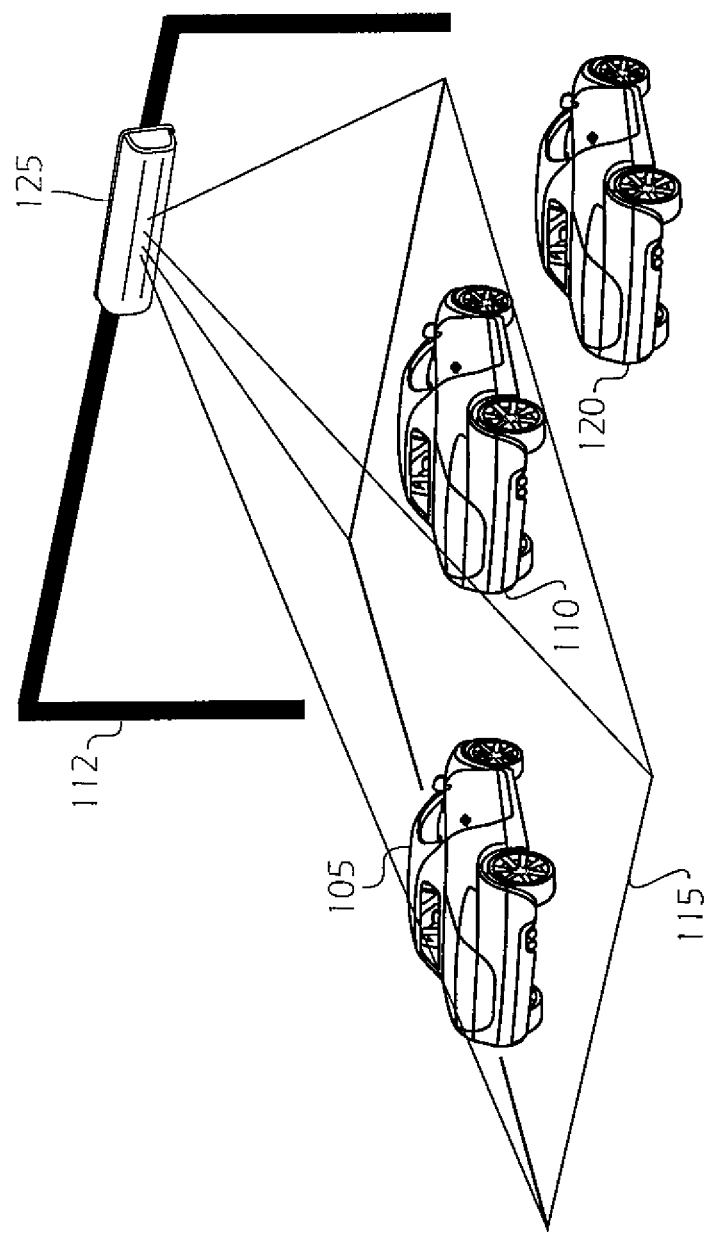
FIG. 1 is a perspective view of a toll collection system according to an embodiment of the present invention.

Referring to FIG. 1, it is an object of one embodiment to illuminate, for RF interrogation and identification, vehicles 105, 110 approaching a gantry 112 while the vehicles are within a rectangular collection zone 115 in front of the gantry 112. It is also an object not to illuminate vehicles not in the collection zone 115, such as a vehicle 120 which may be on an off-ramp adjacent to the collection zone 115. Moreover, a collection system may have one or more cameras for photographing vehicles in the collection zone. These cameras may be synchronized with the RF interrogation system, to provide photographic confirmation of vehicles identified by the RF interrogation system. Illuminating the roadway downstream of the gantry may place a burden on, and potentially confuse, the system, because vehicles in this region have passed the gantry and left the field of view of the collection system's cameras; either tolls have already been collected, or the vehicles are no longer candidates for toll collection. Illuminating the roadway outside of the collection zone 115 on the upstream side of the gantry (i.e., the side from which vehicles are approaching) may or may not be detrimental to the performance of the system.

As illustrated in FIG. 1, an RF antenna 125 is mounted on a gantry 112 and offset from the center of the gantry 112, providing an illumination pattern which is sufficient to reliably interrogate tags on vehicles within the collection zone 115, but which provides sufficiently low RF illumination outside of the collection zone 115 to avoid interrogating any tag on a vehicle outside the collection zone 115. The RF antenna may be located just to one side or the other of the center of the gantry 112, or it may be located well away from the center, e.g., beyond the edge of the roadway, or it may be secured to a stanchion supporting one end of a horizontal member of the gantry 112. In operation the antenna 125 operates in both a transmit mode, to illuminate tags, and in a receive mode, to receive signals returned, in response to being illuminated, by the tags.

Figure 2:
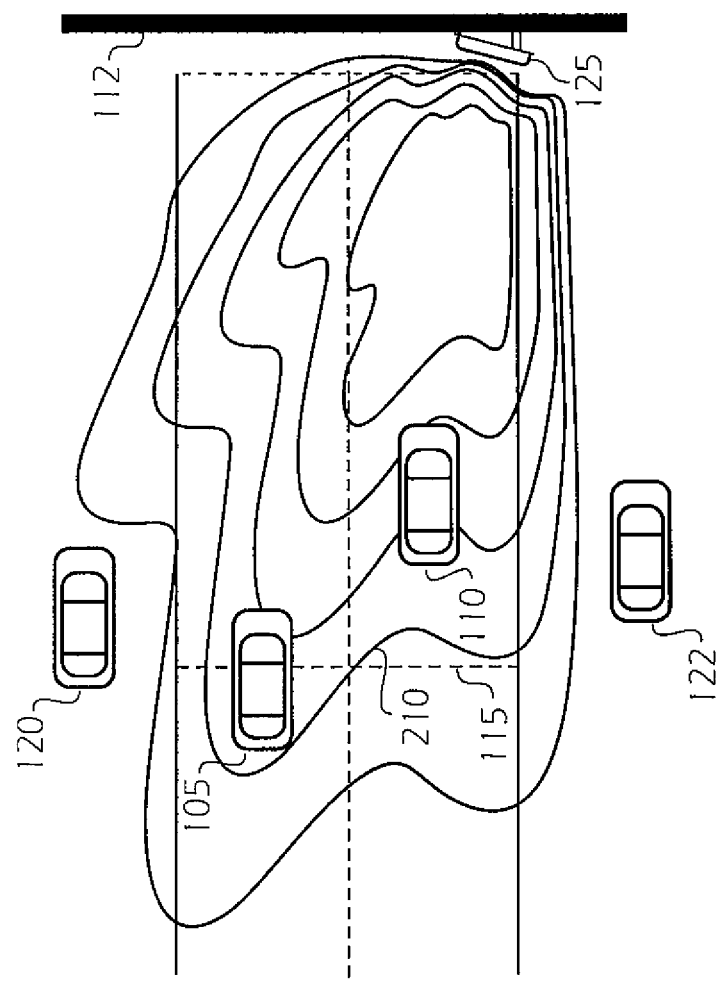
FIG. 2 is a top view of a toll collection system according to an embodiment of the present invention.

FIG. 2 shows a plot of contours of constant RF illumination, i.e., constant RF amplitude, overlaid on an illustration of a roadway showing two vehicles 105, 110, for which tolls are to be collected, and two vehicles 120, 122, for which tolls are not to be collected. In one embodiment an antenna 125 generates an antenna pattern with a contour 210 of constant RF amplitude approximating the collection zone 115 at a threshold amplitude sufficient to read an RF tag. As a result, the two vehicles 105, 110, for which tolls are to be collected, drive through the interior of the contour 210 within which there is sufficient RF illumination to read RF tags, and the vehicles 120, 122 for which tolls are not to be collected do not. Thus, it may be advantageous for the antenna pattern to have a gain exceeding a threshold over the rectangular collection zone 115, and a gain less than the threshold in each of two regions on either side of the rectangular collection zone 115, i.e., in regions where spillover into adjacent lanes or roads may cause tolls to be charged when they should not be.

In one embodiment, the antenna 125 is installed on a gantry 112 at one end of the collection zone 115, with the boresight of the antenna 125, i.e., a line drawn through the center of the antenna 125 and perpendicular to the plane of the antenna 125, aimed below horizontal in elevation and diagonally across the collection zone 115 in azimuth, so that the boresight intersects the ground at the edge of the collection zone 115 opposite the gantry 112. In an installation on a two-lane collection zone 115 as illustrated in FIG. 2, the collection zone 115 may be 38 feet wide and 70 feet long, and the antenna 125 may be installed at a point 4 feet from the right edge of the right lane, with the antenna boresight centered on the center of the left lane, e.g., 9.5 feet from the left edge of the left lane, at the point where the left lane crosses the distant edge of the collection area. In other embodiments the dimensions of the collection zone may vary depending, e.g. on the width of the lanes, the number of lanes, and the speed of the traffic. For example the width of the collection zone may be between 30 feet and 50 feet, and the length may be between 60 feet and 80 feet.

Figure 3:
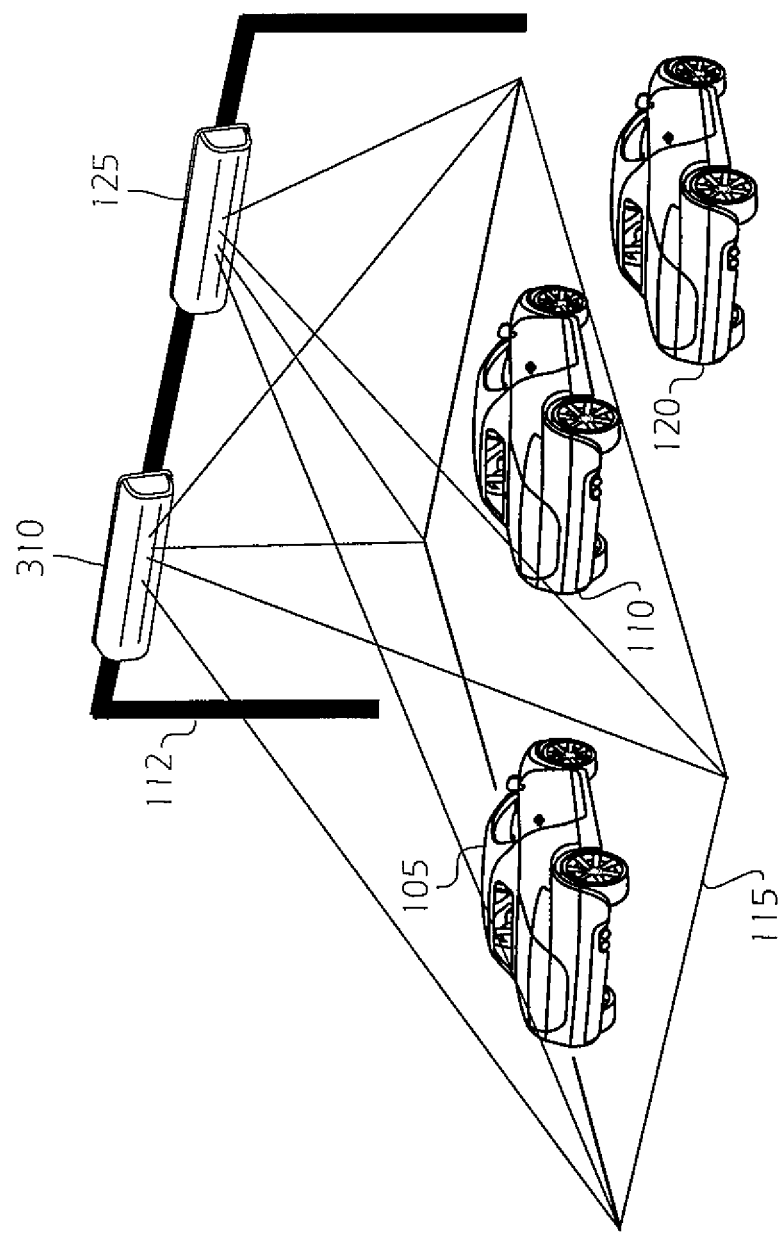
FIG. 3 is a perspective view of a toll collection system according to another embodiment of the present invention.

Referring to FIG. 3, in one embodiment, two RF antennas 125, 310 are used, one on each side of the gantry 112. These antennas may be installed approximately equal distances to either side of the centerline of the roadway, and the antenna pattern one antenna produces may be a mirror image of the antenna pattern the other antenna produces. Because each antenna illuminates the roadway from one side, i.e., not from the center of the gantry 112, a tall vehicle will not cast a shadow preventing the RF from the antennas 125, 310 from illuminating a short vehicle following the tall vehicle. In other embodiments, one antenna is installed farther from the centerline of the roadway than the other, and the antenna patterns are separately designed to provide sufficient RF illumination to read an RF tag inside a region approximating the collection zone 115 and insufficient illumination to read an RF tag outside of this region. Both antennas may illuminate substantially the same collection zone 115, or they may illuminate different rectangular collection zones.

Figure 4:
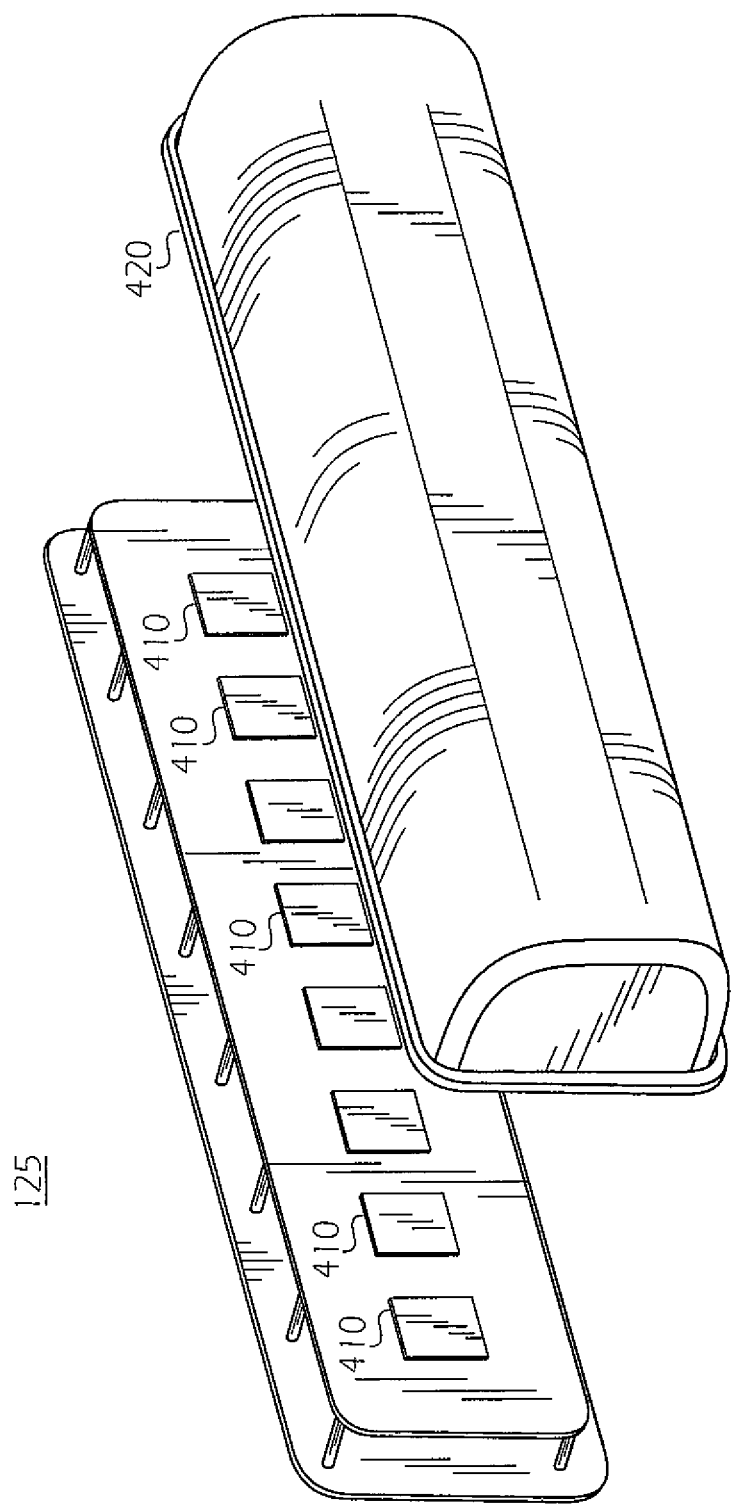
FIG. 4 is a perspective view of a linear array antenna according to an embodiment of the present invention.

Referring to FIG. 4, in one embodiment, the RF antenna is a linear array antenna with a synthesized shaped beam pattern tailored to the collection zone 115. The array antenna elements 410 may be patch antennas as illustrated, or other radiating elements, and the antenna 125 may include a weatherproof cover 420. A passive corporate feed is used both in transmit mode and in receive mode, resulting in transmit and receive antenna patterns that are substantially the same. The relative phases and amplitudes of the antenna elements are controlled, respectively, by adjusting the lengths between the common feed and the radiating elements, and by adjusting the splitting ratios in the corporate feed network. The splitting ratio in a transmission line tee in the corporate feed network may be adjusted by adjusting the characteristic impedances of the arms of the tee. In one embodiment an array including eight antenna elements is used, as illustrated in FIG. 4; in other embodiments, more or fewer elements are used. In one embodiment the antenna elements have a center-to-center spacing of approximately 6 inches, and the operating frequency is approximately 1 GHz, so that the element spacing corresponds to one half wavelength of the radiation. The operating frequency may also be influenced by regulatory constraints and may be 915 MHz, and the element spacing may be 5.8 inches. The array antenna may be a one-dimensional array, oriented horizontally, as illustrated in FIG. 4, or a two-dimensional array, in which case adjusting the relative phase and amplitude of the elements in the vertical direction provides additional flexibility to shape the beam in elevation as well as azimuth.

Figure 5:
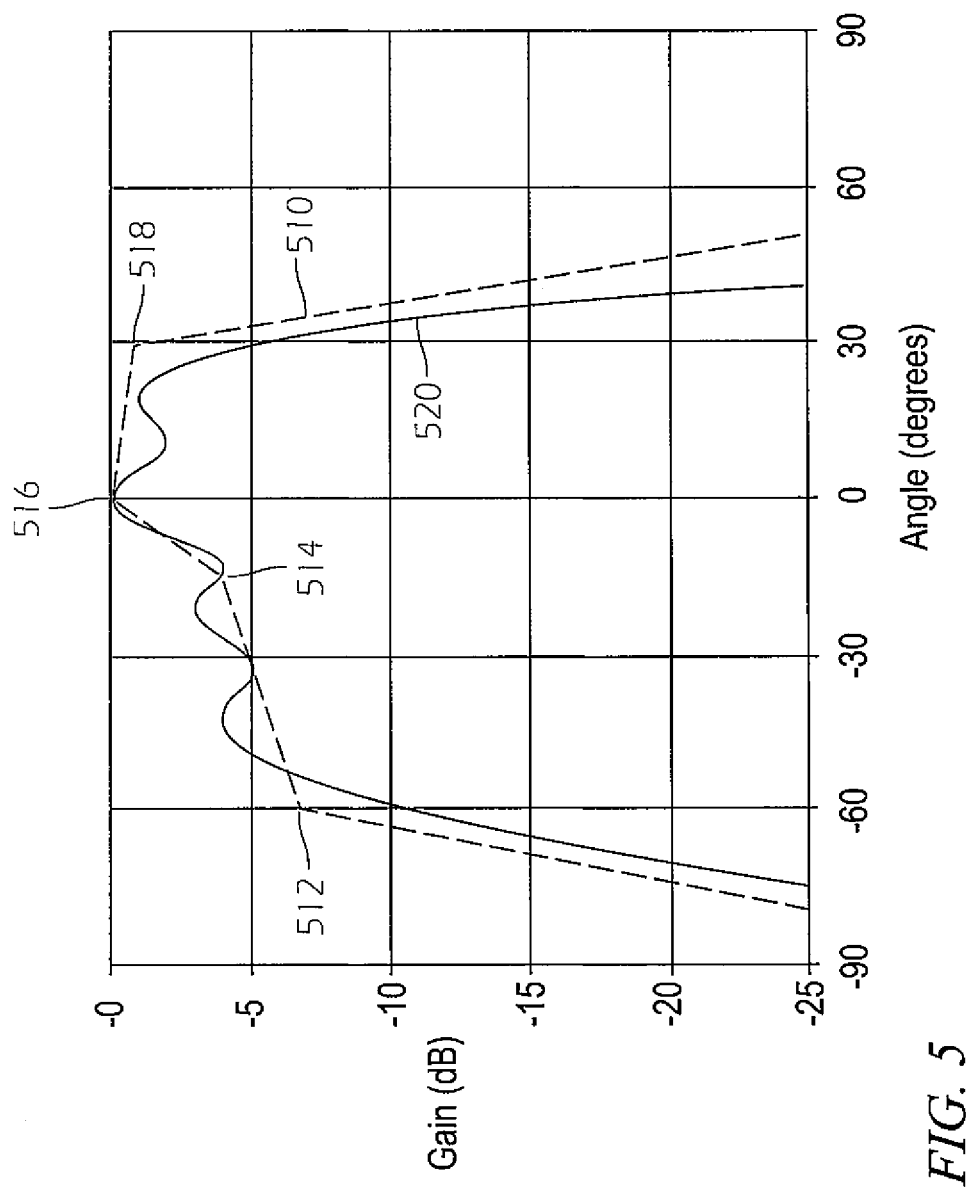
FIG. 5 is a plot of an approximate desired antenna pattern and of a realizable antenna pattern according to an embodiment of the present invention.

Referring to FIG. 5, in one embodiment a piecewise-linear curve 510 may be used as a desired azimuth antenna pattern. This piecewise-linear desired antenna pattern 510 is not realizable using a linear array antenna 125, but the piecewise-linear desired antenna pattern 510 may be used as a guide for designing a linear array antenna 125 producing an antenna pattern approximating the piecewise-linear desired antenna pattern 510. This piecewise-linear desired antenna pattern 510 may be created by selecting as nodes the points 512, 514, 516, 518, the azimuth angles of which correspond to the four corners of the collection zone 115. The gain at each node may be selected so that the RF power radiated in the direction of the node, and in the direction of the corresponding corner of the collection zone 115, is proportional to the reciprocal of the square of the distance from the antenna to the corner of the collection zone 115, so that if the collection zone were illuminated with the piecewise-linear desired antenna pattern 510, each corner of the collection zone 115 would receive RF illumination with the same irradiance. Outside of the range of angles between the points 512 and 518, i.e., at angles less than the angle of the first node, and greater than the angle of the fourth node, the slope of the piecewise-linear desired antenna pattern 510 may be selected to fall off with a slope approximating the slope realizable with a real antenna, e.g., at 1 dB per degree. In other embodiments other slopes may be used, e.g., varying by 30% from 1 dB per degree, i.e., a slope may be used that is in the range 0.7 dB per degree to 1.3 dB per degree. A realizable antenna pattern, represented by the curve 520, may then be designed to approximate the piecewise-linear desired antenna pattern 510.

An antenna pattern synthesis technique referred to as Orchard-Elliot may be used to find amplitude and phase coefficients, or "feed" coefficients, or "excitation" coefficients, or "weights" for the elements or "radiating elements" of the linear array antenna, for which the antenna pattern of the linear array antenna will approximate the piecewise-linear desired antenna pattern 510. As used herein, a "weight" is understood to be a complex number representing an amplitude and a phase. When the antenna is transmitting, each radiating element may be excited with the corresponding weight. This synthesis technique relies on the fact that the far-field antenna pattern of an equi-spaced linear array may be written as a sum of terms, each corresponding to the contribution of one antenna element, and that this sum may be written, with a change of variables, as a polynomial, and rewritten in factored form, where each factor corresponds to a complex root of the polynomial. The complex roots may be moved in the complex plane until an antenna pattern with satisfactory characteristics is found; the factors may then be multiplied to return to a polynomial form from which the weight for each antenna element may be determined. In one embodiment, the use of this method results in the following relative weights for the elements of an eight-element linear array:

| Element | Amplitude | Phase (degrees) |
|---------|-----------|-----------------|
| 1 | 0.477 | −72.102 |
| 2 | 0.602 | −52.656 |
| 3 | 1 | 0 |
| 4 | 0.925 | 19.942 |
| 5 | 0.953 | 78.395 |
| 6 | 0.934 | 40.881 |
| 7 | 0.992 | −43.73 |
| 8 | 0.648 | −87.617 |

In one embodiment the array antenna pattern is switchable, i.e., the array antenna contains switches for changing the weights of the antenna elements, to select one of a plurality of possible configurations. For example, a single model of the array antenna, switchable between different configurations each of which illuminates a different zone relative to the antenna, may be manufactured. An installer installing one such antenna over a roadway may then select a suitable mounting location on a gantry over the roadway and then, using the switches, select an antenna configuration that illuminates a suitable region on the roadway relative to the selected mounting location.

In another related embodiment, the antenna may be dynamically switchable, e.g., as a result of one or more of the switches being electronically controlled. Such an antenna may be installed over a multi-lane roadway the use of which may vary, e.g., depending on the time of day, and a subset of the lanes may be illuminated, depending on the set of lanes to which toll charges are to be applied. For example, a gantry may be installed at the south end of an eight-lane roadway carrying both northbound and southbound traffic; in the morning five lanes may be northbound and three southbound, and in the afternoon, five lanes may be southbound and three northbound. Vehicles may be charged a toll when entering the roadway, i.e., both in the morning and in the afternoon, the vehicles in northbound lanes may be subject to toll charges. In this case, the antenna may be operated in a first configuration in which the five northbound lanes are illuminated in the morning, and switched to a second configuration, in which only the three northbound lanes are illuminated, in the afternoon.

Although limited embodiments of an array antenna with shaped beam pattern for toll road collection system applications have been specifically described and illustrated herein, many modifications and variations will be apparent to those skilled in the art. Accordingly, it is to be understood that the array antenna with shaped beam pattern for toll road collection system applications employed according to principles of this invention may be embodied other than as specifically described herein. The invention is also defined in the following claims, and equivalents thereof.

What is claimed is:

1. An array antenna for toll collection over a first rectangular zone, the antenna comprising:
a plurality of elements; and
a feed network operatively coupled to the plurality of elements;
the elements and the feed network being configured to form a first asymmetric transmitting antenna pattern and a first asymmetric receiving antenna pattern, the first transmitting antenna pattern being asymmetric in azimuth about a direction of maximum gain and being substantially the same as the first receiving antenna pattern, and the first transmitting antenna pattern having a gain exceeding a threshold over the first rectangular zone, and a gain less than the threshold in a region outside of the first rectangular zone.

2. The array antenna of claim 1, wherein each of the elements is associated with a complex weight.

3. The array antenna of claim 2, wherein each complex weight is substantially equal to a corresponding complex weight produced by an Orchard-Elliot synthesis technique executed with a first piecewise-linear desired antenna pattern.

4. The array antenna of claim 3, wherein the first piecewise-linear desired antenna pattern has four nodes, each of the four nodes corresponding to one corner of the first rectangular zone.

5. The array antenna of claim 4, wherein the power gain of the first piecewise-linear desired antenna pattern at each of the nodes is proportional to the reciprocal of the square of the distance from the array antenna to the corresponding corner of the first rectangular zone.

6. The array antenna of claim 4, wherein the first piecewise-linear desired antenna pattern falls off with a first constant slope, in decibels (dB) per degree, at angles less than the angle of a first node and the first piecewise-linear desired antenna pattern falls off with a second constant slope, in dB per degree, at angles exceeding the angle of a fourth node.

7. The array antenna of claim 6, wherein the first constant slope is within 30% of 1 dB per degree, and the second constant slope is within 30% of 1 dB per degree.

8. The array antenna of claim 1, wherein the first rectangular zone has a length between 60 and 80 feet, and a width between 30 feet and 50 feet.

9. The array antenna of claim 8, wherein the first rectangular zone is horizontal, and the array antenna is located above a short edge of the first rectangular zone, at a point between 1 foot and 10 feet from a long edge of the first rectangular zone.

10. The array antenna of claim 9, wherein the array antenna comprises 8 elements.

11. The array antenna of claim 10, wherein each of the 8 elements is associated with a complex weight, the complex weights having substantially the following relative amplitudes and phases, respectively:

| Element number | Amplitude | Phase (degrees) |
|---|---|---|
| 1 | 0.477 | −72.102 |
| 2 | 0.602 | −52.656 |
| 3 | 1 | 0 |
| 4 | 0.925 | 19.942 |
| 5 | 0.953 | 78.395 |
| 6 | 0.934 | 40.881 |
| 7 | 0.992 | −43.73 |
| 8 | 0.648 | −87.617. |

12. The array antenna of claim 11, wherein:
the center of each of the 8 elements is separated from the center of an adjacent element of the 8 elements by a distance of 5.8 inches; and
the array antenna is configured to operate at a frequency of 915 MHz.

13. The array antenna of claim 1, comprising one or more switches configured to switch between a first configuration and a second configuration, wherein:
in the first configuration, the elements and the feed network are configured to form a first asymmetric transmitting antenna pattern and a first asymmetric receiving antenna pattern, the first transmitting antenna pattern being substantially the same as the first receiving antenna pattern, the first transmitting antenna pattern having a gain exceeding a threshold over the first rectangular zone, and a gain less than the threshold in a region outside of the first rectangular zone; and
in the second configuration, the elements and the feed network are configured to form a second asymmetric transmitting antenna pattern and a second asymmetric receiving antenna pattern, the second transmitting antenna pattern being substantially the same as the second receiving antenna pattern, the second transmitting antenna pattern having a gain exceeding the threshold over a second rectangular zone, and a gain less than the threshold in a region outside of the second rectangular zone.

14. The array antenna of claim 13, wherein one of the one or more switches is an electronically controlled switch.

15. A system for toll collection, comprising a gantry installed over a roadway, and a first array antenna, the first array antenna being an array antenna according to claim 1.

16. The system of claim 15, wherein the first array antenna comprises one or more switches configured to switch between a first configuration and a second configuration, wherein:
in the first configuration, the elements and the feed network are configured to form a first asymmetric transmitting antenna pattern and a first asymmetric receiving antenna pattern, the first transmitting antenna pattern being substantially the same as the first receiving antenna pattern, the first transmitting antenna pattern having a gain exceeding a threshold over the first rectangular zone, and a gain less than the threshold in a region outside of the first rectangular zone; and
in the second configuration, the elements and the feed network are configured to form a second asymmetric transmitting antenna pattern and a second asymmetric receiving antenna pattern, the second transmitting antenna pattern being substantially the same as the second receiving antenna pattern, the second transmitting antenna pattern having a gain exceeding the threshold over a second rectangular zone, and a gain less than the threshold in a region outside of the second rectangular zone.

17. The system of claim 16, wherein the roadway comprises a set of parallel lanes, the first rectangular zone includes a first subset of the set of parallel lanes, the lanes in the first subset being contiguous, and the second rectangular zone includes a second subset of the set of parallel lanes, the lanes in the second subset being contiguous.

18. The system of claim 17, wherein one of the one or more switches is an electronically controlled switch, and the system is configured to switch electronically to select:
the first configuration when the first subset of the set of parallel lanes is configured to carry vehicle traffic subject to toll charges; and
the second configuration when the second subset of the set of parallel lanes is configured to carry vehicle traffic subject to toll charges.

19. A system for toll collection, comprising:
a gantry installed over a roadway;
a first array antenna according to claim 1, secured to the gantry; and
a second array antenna according to claim 1, secured to the gantry.

20. The system of claim 19, wherein the first rectangular zone of the first array antenna is the same rectangular zone as the first rectangular zone of the second array antenna.

* * * * *